United States Patent
Jansson et al.

(10) Patent No.: US 11,545,122 B2
(45) Date of Patent: Jan. 3, 2023

(54) SYSTEMS AND METHODS FOR EMBEDDING DATA IN MEDIA CONTENT

(71) Applicant: Spotify AB, Stockholm (SE)

(72) Inventors: Andreas Jansson, Brooklyn, NY (US); David Samuel Rubinstein, New York, NY (US); Peter Milan Thomson Sobot, Brooklyn, NY (US)

(73) Assignee: Spotify AB, Stockholm (SE)

(*) Notice: Subject to any disclaimer, the term of this patent is extended or adjusted under 35 U.S.C. 154(b) by 200 days.

(21) Appl. No.: 16/989,644

(22) Filed: Aug. 10, 2020

(65) Prior Publication Data

US 2021/0097966 A1    Apr. 1, 2021

Related U.S. Application Data

(63) Continuation of application No. 16/588,470, filed on Sep. 30, 2019, now Pat. No. 10,777,177.

(51) Int. Cl.
*G10H 1/26* (2006.01)
*H04S 1/00* (2006.01)
*G06F 16/683* (2019.01)

(52) U.S. Cl.
CPC .......... *G10H 1/26* (2013.01); *G06F 16/685* (2019.01); *H04S 1/007* (2013.01)

(58) Field of Classification Search
CPC .. G10H 1/00; G10H 1/0058; G10H 2240/175; G10H 1/365; G10H 2240/071; G10H 2240/325; G10H 2240/031; G10H 2240/171; G10H 7/02; G10H 1/08; G10H 1/0033; G10H 1/188; G10H 1/36; G10H 1/26

See application file for complete search history.

(56) References Cited

U.S. PATENT DOCUMENTS

| | | | |
|---|---|---|---|
| 8,170,230 B1 | 5/2012 | Ramirez | |
| 8,219,223 B1 | 7/2012 | Ramirez | |
| 9,454,343 B1* | 9/2016 | Blesser | ................. H04L 9/0861 |
| 2003/0172277 A1 | 9/2003 | Suzuki et al. | |
| 2004/0148159 A1 | 7/2004 | Crockett et al. | |
| 2008/0130903 A1 | 6/2008 | Ojanpera | |

(Continued)

FOREIGN PATENT DOCUMENTS

| | | | |
|---|---|---|---|
| CN | 101996633 A | * | 3/2011 |
| CN | 101996633 B | | 12/2013 |

(Continued)

OTHER PUBLICATIONS

Jansson, Notice of Allowance, U.S. Appl. No. 16/588,470, dated May 14, 2020, 9 pgs.

(Continued)

*Primary Examiner* — Marlon T Fletcher
(74) *Attorney, Agent, or Firm* — Morgan, Lewis & Bockius LLP

(57) ABSTRACT

An electronic device modifies a first media content item by superimposing a first set of data over a first accented musical event. The first accented musical event has a first audio profile. The first set of data has a second audio profile configured to be masked by the first audio profile during playback of the first media content item. The electronic device transmits, to a second electronic device, the modified first media content item.

20 Claims, 6 Drawing Sheets

(56) References Cited

U.S. PATENT DOCUMENTS

| | | | |
|---|---|---|---|
| 2008/0156178 A1* | 7/2008 | Georges | G10H 1/365 84/645 |
| 2011/0174137 A1* | 7/2011 | Okuyama | G10H 1/0041 84/600 |
| 2013/0322648 A1 | 12/2013 | Chukka et al. | |
| 2014/0000440 A1* | 1/2014 | Georges | G10H 1/0025 84/609 |
| 2014/0257802 A1 | 9/2014 | Asada et al. | |
| 2014/0270254 A1 | 9/2014 | Oishi et al. | |
| 2015/0030175 A1 | 1/2015 | Roggenkam et al. | |
| 2015/0334459 A1 | 11/2015 | Oh et al. | |
| 2017/0150286 A1 | 5/2017 | Sporer et al. | |
| 2017/0245079 A1 | 8/2017 | Sheen et al. | |
| 2017/0256271 A1* | 9/2017 | Lyon | G10L 21/02 |
| 2018/0343224 A1 | 11/2018 | Lord | |

FOREIGN PATENT DOCUMENTS

| | | | | |
|---|---|---|---|---|
| EP | 2268057 A1 | * | 12/2010 | G10H 1/0058 |
| EP | 2613309 A2 | * | 7/2013 | G10H 1/0066 |
| JP | 2005528029 A | * | 5/2003 | |
| JP | 2011145541 A | * | 7/2011 | G10H 1/0041 |
| WO | WO-2006022606 A2 | * | 3/2006 | G06F 3/165 |
| WO | WO2009/107054 A1 | | 9/2009 | |
| WO | WO-2009107054 A1 | * | 9/2009 | G10L 19/008 |

OTHER PUBLICATIONS

Spotify AB, Extended European Search Report, EP20191908.1, dated Jan. 22, 2021, 11 pgs.

Spotify AB, Communication pursuant to Article 94(3) EPC, EP20191908.1, Sep. 21, 2022, 6 pgs.

* cited by examiner

SYSTEMS AND METHODS FOR EMBEDDING DATA IN MEDIA CONTENT

RELATED APPLICATION

This application is a continuation of U.S. patent application Ser. No. 16/588,470, filed Sep. 30, 2019, entitled "Systems and Methods for Embedding Data in Media Content," which is incorporated by reference in its entirety.

TECHNICAL FIELD

The disclosed embodiments relate generally to media playback, and, in particular, to modifying a media content item by embedding data into the media content item.

BACKGROUND

Access to electronic media, such as music and video content, has expanded dramatically over time. As a departure from physical media, media content providers stream media to electronic devices across wireless networks, improving the convenience with which users can digest and experience such content.

Communicating data from a first device to a second device typically requires a wired or wireless communication connection to be established between the devices. For example, a user may need to configure communication hardware for a wired communication connection, or access a user interface to initiate and/or authorize a wireless communication connection. In some cases, a user must determine identifying information for one or more devices in order to establish a communication connection between the devices.

SUMMARY

There is a need for systems and methods of enabling communication between devices using output (e.g., audio output) of the device. In this way, data may be transmitted from a first device to a second device without requiring user action to establish a communication connection between the devices.

A system is provided for embedding information (such as metadata related to a media content item) in a media content item such that the embedded information is undetectable by the human ear. The system identifies one or more audio events (e.g., portions of the media content item that have large amplitudes relative to the media content item as a whole). For example, the identified audio events correspond to drum beats in the audio content item. The information is superimposed over portions of the media content item that correspond to the identified audio events. In this way, information embedded as an audio signal with an amplitude that is lower than the amplitude of the audio event is undetectable to the user due to the principles of auditory masking. While the altered media content item is played back (e.g., by a speaker), a receiving device (e.g., a microphone) receives the altered media content item including the embedded audio signal. The receiving device detects the embedded audio signal and decodes the embedded information. Thus, information transfer between devices, without human detection, is possible by embedding the information in the media content item.

In accordance with some embodiments, a method is performed at a first electronic device. The first electronic device has one or more processors and memory storing instructions for execution by the one or more processors. The method includes determining a first audio event of a first media content item. The method further includes modifying the first media content item by superimposing a first set of data that corresponds to the first media content item over the first audio event. The first audio event has a first audio profile configured to be presented over a first channel for playback. The first set of data has a second audio profile configured to be presented over the first channel for playback. Playback of the second audio profile is configured to be masked by the first audio profile during playback of the first media content item. The method further includes transmitting, to a second electronic device, the modified first media content item.

In some embodiments, the first channel is a left stereo channel or a right stereo channel.

In some embodiments, the first audio profile is configured to be presented over the first channel and a second channel for playback, and the second audio profile is configured to be presented over the first channel and the second channel for playback.

In some embodiments, the first audio event is a first audio event of a plurality of audio events.

In some embodiments, a respective audio event of the plurality of audio events is a beat.

In some embodiments, the first set of data is encoded as a series of pulses superimposed over the plurality of audio events of the first media content item.

In some embodiments, the first audio event is identified as an audio event in accordance with a determination that the first audio event occurs at an amplitude of the first media content item above a first threshold amplitude.

In some embodiments, the first audio event is identified as an audio event using an algorithm that identifies periodically repeating patterns.

In some embodiments, the first set of data includes at least one of timing information, a title of the first media content item, an artist of the first media content item, lyrics for the first media content item, or playlist information.

In some embodiments, the first set of data is encoded as noise superimposed over the first media content item.

In some embodiments, the first set of data is overlaid at a position in the first media content item that corresponds to the first audio event and for a predetermined time after the first audio event.

In some embodiments, the first audio event has a first amplitude that is higher than a second amplitude of the first set of the data.

In some embodiments, the first set of the data has a frequency profile that corresponds to a frequency profile of the first audio event.

In some embodiments, the method further includes modifying the first media content item by superimposing a second set of data that corresponds to the first media content item over a second audio event.

In some embodiments, modifying the first media content item by superimposing the first set of data that corresponds to the first media content item over the first audio event comprises encoding the first set of data to an audio signal and superimposing the audio signal over the first audio profile of the first audio event.

In accordance with some embodiments, a first electronic device (e.g., a server system, a client device, etc.) includes one or more processors and memory storing one or more programs configured to be executed by the one or more processors. The one or more programs include instructions for determining a first audio event of a first media content item. The one or more programs further include instructions for modifying the first media content item by superimposing a first set of data that corresponds to the first media content item over the first audio event. The first audio event has a first audio profile configured to be presented over a first channel for playback. The first set of data has a second audio profile configured to be presented over the first channel for playback. Playback of the second audio profile is configured to be masked by the first audio profile during playback of the first media content item. The one or more programs further include instructions for transmitting, to a second electronic device, the modified first media content item.

In accordance with some embodiments, a computer-readable storage medium has stored therein instructions that, when executed by an electronic device, cause the first electronic device to determine a first audio event of o a first media content item. The instructions further cause the first electronic device to modify the first media content item by superimposing a first set of data that corresponds to the first media content item over the first audio event. The first audio event has a first audio profile configured to be presented over a first channel for playback. The first set of data has a second audio profile configured to be presented over the first channel for playback. Playback of the second audio profile is configured to be masked by the first audio profile during playback of the first media content item. The instructions further cause the first electronic device to transmit, to a second electronic device, the modified first media content item.

Thus, systems are provided with improved methods for providing information associated with media content items based on a proxy media content item.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Figure 1:
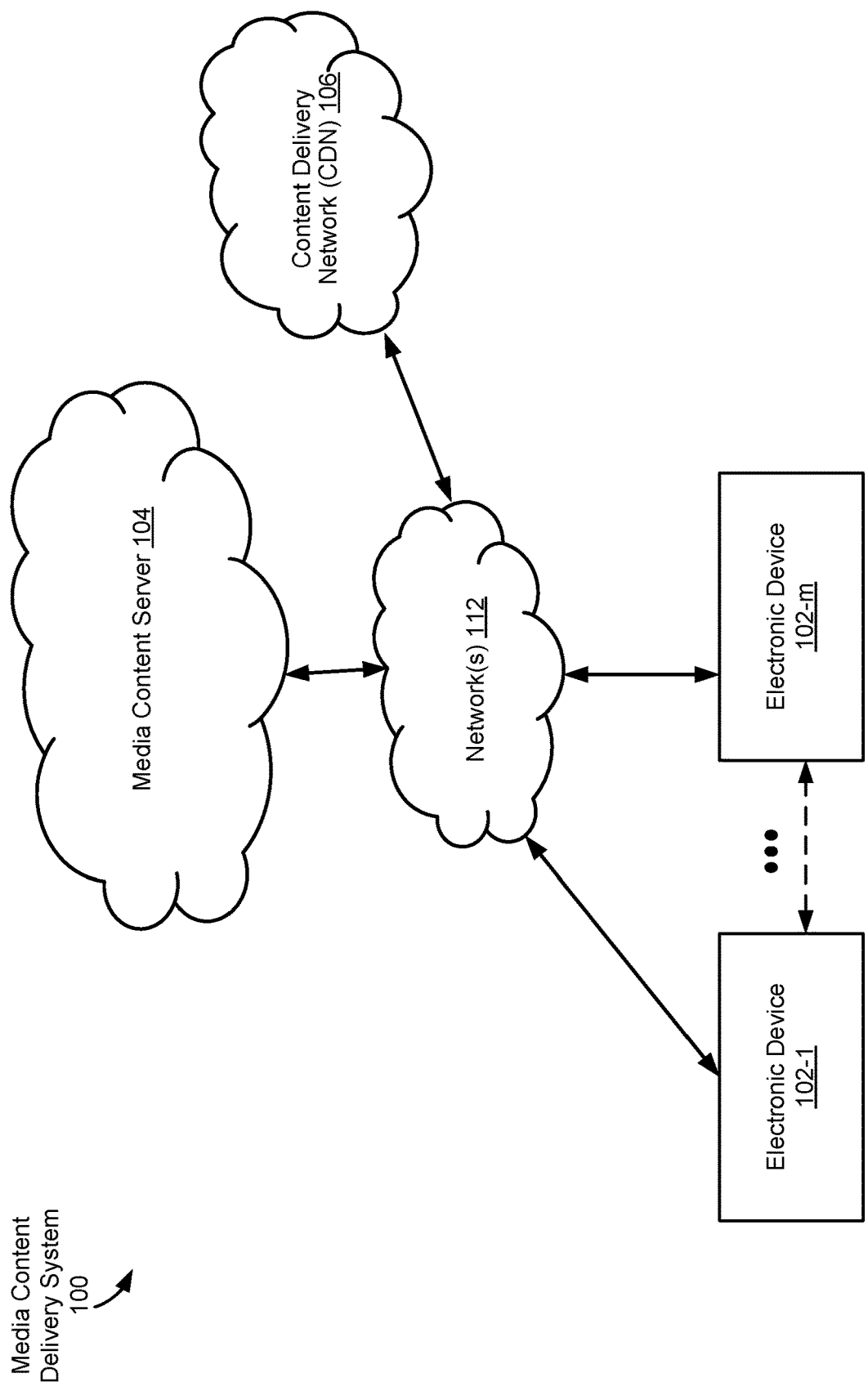
FIG. 1 is a block diagram illustrating a media content delivery system, in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Embodiments described herein relate to modifying media content to include information without changing the presentation quality of the media content for a user. The additional information is superimposed over the media content itself such that the additional information is imperceptible to a user during presentation of the media content item. In some embodiments, a device that detects playback (e.g., via a microphone) of the modified media content (e.g., as the media content is played) isolates the additional information that is masked in the modified media content (e.g., for display of the additional information by a device display).

Auditory masking is achieved when the perception of one sound is affected by another sound. For example, a first audio profile (e.g., that corresponds to a media content item) is overlaid with a second audio profile (e.g., that includes encoded data) such that the second audio profile is masked by the first audio profile. In some embodiments, the second audio profile is masked such that a user listening to a media content item (e.g., the first audio profile) does not perceive the second audio profile. Auditory masking can be performed in the frequency domain or in the time domain. Examples of auditory masking include simultaneous masking, frequency masking, spectral masking, temporal masking, and non-simultaneous masking. In some embodiments, auditory masking is performed by overlaying two audio profiles, where the first audio profile has a higher amplitude to mask the second audio profile (e.g., with a lower amplitude). In some embodiments, auditory masking is performed by using a second audio profile that has a frequency that is outside of a range of human hearing. In some embodiments, auditory masking is performed by selecting a second audio profile that has a frequency that corresponds to a frequency of the first audio profile.

Modifying a media content item by superimposing data over an audio event in the media content item (e.g., such that a device that detects playback of media content item is enabled to detect the data embedded in the media content item) enables information to be communicated to from a first device to a second device with increased efficiency (e.g., by reducing or eliminating device configuration required for information to be communicated). Increasing the efficiency with which information is communicated from for (e.g., instead of the second electronic device performing an independent identification of the content item and requesting information about the content item from a third-party before gaining access to the information). By embedding the data directly into the media content, the processing power required by the electronic device to gain access to the data associated with the media content item is decreased.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content delivery networks (CDNs) 106. The one or more media content servers 104 are associated with (e.g., at least partially compose) a media-providing service. The one or more CDNs 106 store and/or provide one or more content items (e.g., to electronic devices 102). In some embodiments, the one or more CDNs 106 are associated with the media-providing service. In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). In some embodiments, the electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, and/or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
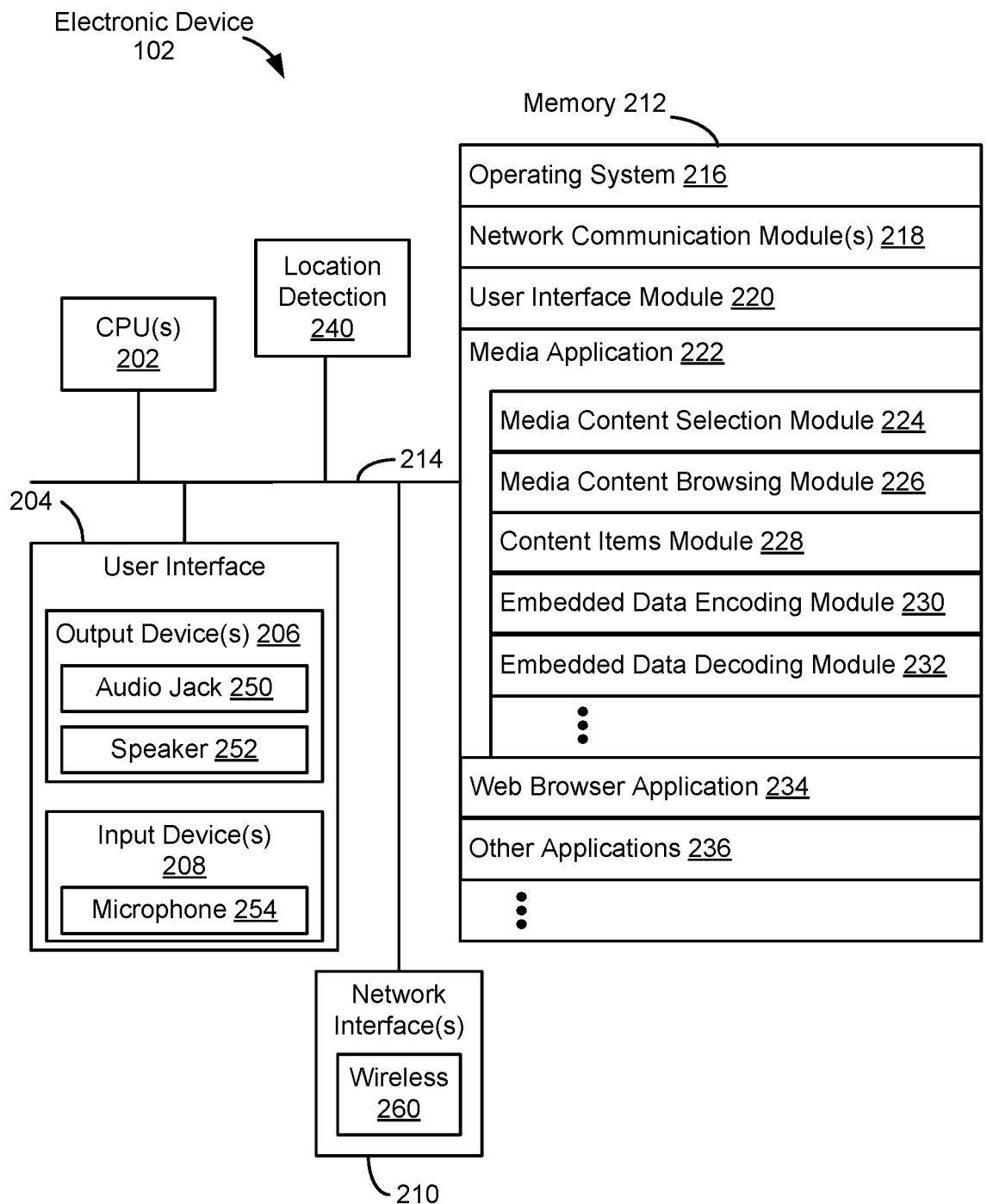
FIG. 2 is a block diagram illustrating a client device, in accordance with some embodiments.

FIG. 2 is a block diagram illustrating an electronic device 102 (e.g., electronic device 102-1 and/or electronic device 102-$m$, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone 254) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;

network communication module(s) 218 for connecting the electronic device 102 to other computing devices (e.g., other electronic device(s) 102, and/or media content server 104) via the one or more network interface(s) 210 (wired or wireless) connected to one or more network(s) 112;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:

a media content selection module 224 for selecting one or more media content items and/or sending, to the media content server, an indication of the selected media content item(s);

a media content browsing module 226 for providing controls and/or user interfaces enabling a user to navigate, select for playback, and otherwise control or interact with media content, whether the media content is stored or played locally or remotely;

a content items module 228 for processing uploaded media items and storing media items for playback and/or for forwarding to the media content server;

an embedded data encoding module 230 for encoding data to be embedded in media content items (e.g., media content items having the embedded data are presented by the electronic device using output device(s) 206); and an embedded data decoding module 232 for decoding data that has been embedded in media content items (e.g., media content items that are received via microphone 254).

a web browser application 234 (e.g., Internet Explorer or Edge by Microsoft, Firefox by Mozilla, Safari by Apple, and/or Chrome by Google) for accessing, viewing, and/or interacting with web sites; and other applications 236, such as applications for word processing, calendaring, mapping, weather, stocks, time keeping, virtual digital assistant, presenting, number crunching (spreadsheets), drawing, instant messaging, e□mail, telephony, video conferencing, photo management, video management, a digital music player, a digital video player, 2D gaming, 3D (e.g., virtual reality) gaming, electronic book reader, and/or workout support.

Figure 3:
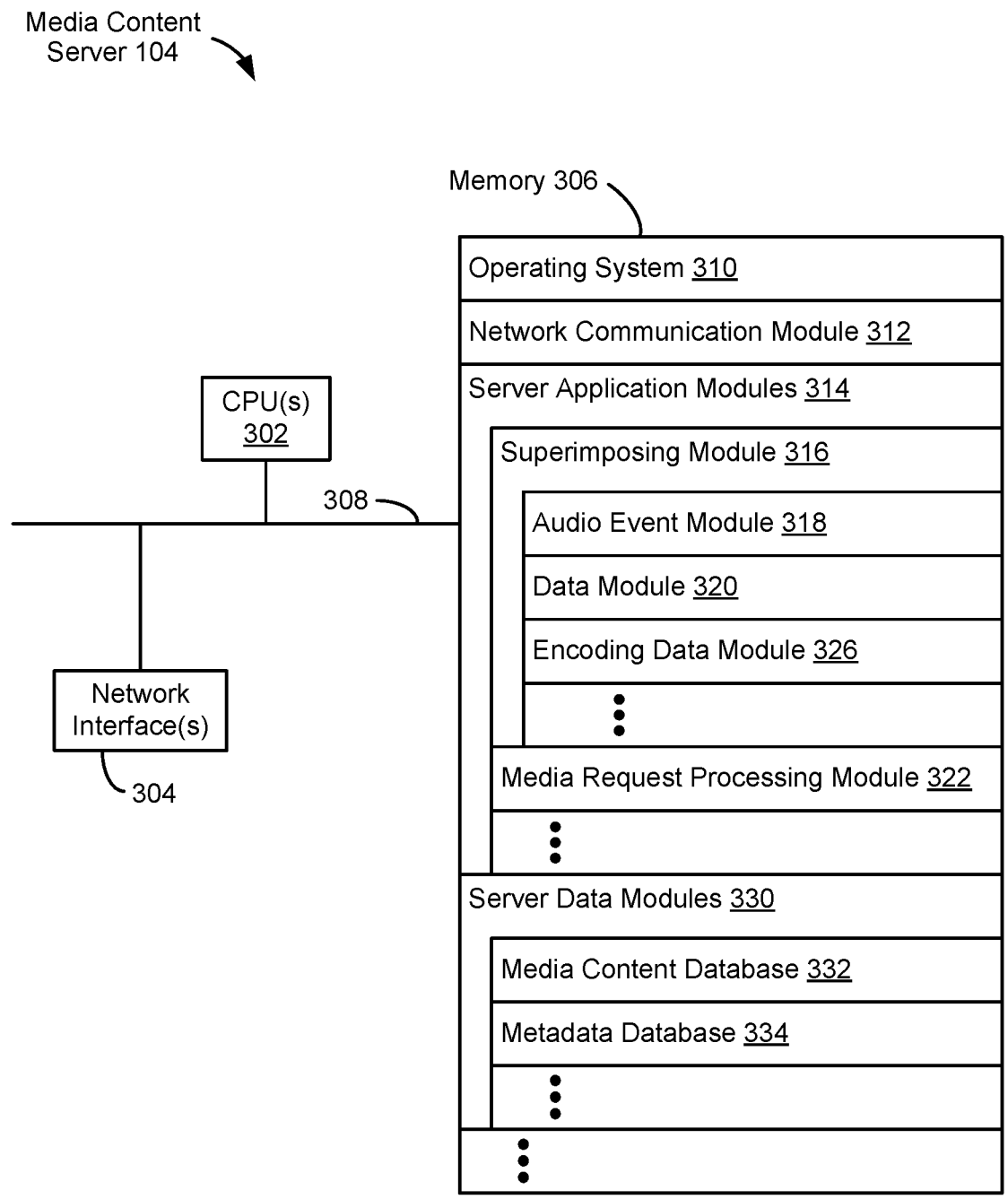
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a superimposing module 316 for modifying media content items by identifying audio events in the media content items and superimposing data over the audio events, the superimposing module 316 including, but not limited to, one or more of:

an audio event module 318 for identifying and/or determining (e.g., using an algorithm) one or more audio events in a media content item;

a data module 320 for storing and/or selecting data (e.g., information) for a media content item to be embedded into the media content item, such as a title of a media content item, lyrics for a media content item, an artist of a media content item, or other information about the media content item; and an encoding data module 326 for modifying media content items by encoding data (e.g., stored in data module 320) into the media content items; and a media request processing module 322 for processing requests for media content and facilitating access to requested media items by electronic devices (e.g., the electronic device 102) including, optionally, streaming media content to such devices;

one or more server data module(s) 330 for handling the storage of and/or access to media items and/or metadata relating to the media items; in some embodiments, the one or more server data module(s) 330 include:

a media content database 332 for storing media items; and a metadata database 334 for storing metadata relating to the media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores one or more of the above identified modules described with regard to memory 306. In some embodiments, memory 306 stores one or more of the above identified modules described with regard to memory 212.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4:
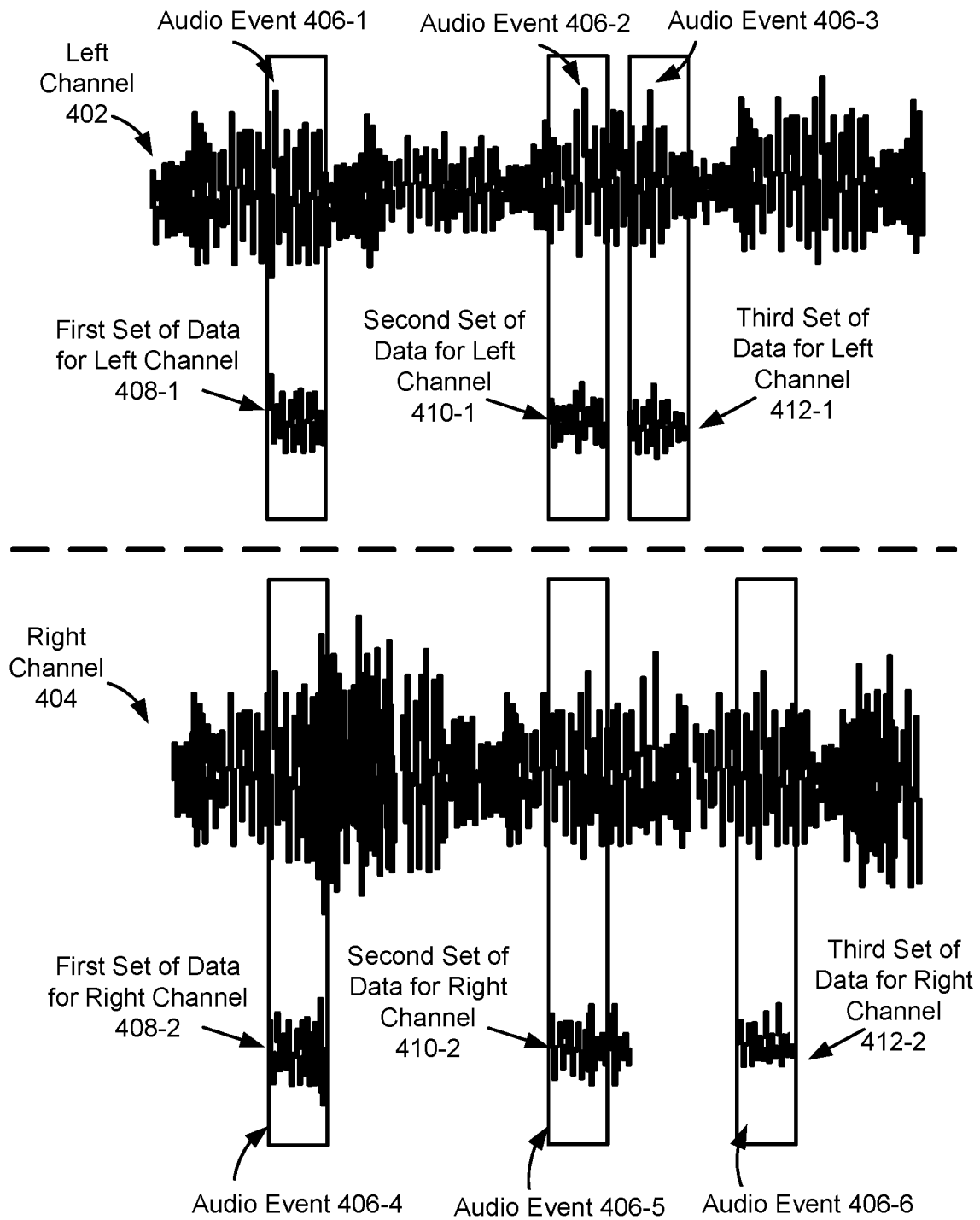
FIG. 4 is a block diagram illustrating embedding data into an audio stream, in accordance with some embodiments.

FIG. 4 illustrates modifying a media content item in accordance with some embodiments. The media content item is modified by superimposing data over the media content item. The first electronic device is configured to overlay the data such that a human ear (e.g., a user's ear) does not perceive the overlaid data. The electronic device presents (e.g., for playback) the modified media content item. A second electronic device (e.g., in proximity to the first electronic device) receives (e.g., through a microphone of the second electronic device) the modified media content item. The second electronic device is enabled to extract the overlaid data. In some embodiments, the second electronic device is enabled to display or otherwise present the extracted data to a user. For example, the modified media content item includes lyrics of the media content item, encoded as an audio signal, overlaid with the media content item. The second electronic device decodes the overlaid audio signal to extract the overlaid audio signal from the modified media content item to access the lyrics, and presents the lyrics on a display for the user.

In some embodiments, a first electronic device (e.g., media content server 104 and/or electronic device 102-1) overlays the data with the media content item in response to a request (e.g., received from a second electronic device 102-m) for information about the media content item. For example, a user requests a title of the media content item. In response to the user request, the first electronic device retrieves the information (e.g., stored in data module 320) and overlays the requested information with the media content item. The modified media content item is streamed for playback (e.g., at electronic device 102-1) and the second electronic device 102-m decodes the requested information from the modified media content item. In some embodiments, the second electronic device 102-m is not playing the modified media content item. For example, the second electronic device 102-m is a smartphone (e.g., that is not playing the media content item), and the modified media content item is played back at a speaker (e.g., first electronic device 102-1).

In some embodiments, the second electronic device 102-m and the first electronic device 102-1 present (e.g., for playback) the modified media content item. For example, the first electronic device 102-1 is a first speaker and the second electronic device 102-m is a second speaker (e.g., that includes a microphone). The modified media content item is streamed to the first speaker. The media content item is modified to overlay timing information (e.g., a timestamp) for the media content item. The second speaker receives (e.g., using the microphone) the modified media content item and decodes the timing information that is superimposed on the media content item. Using the timing information, the second speaker synchronizes playback of the media content item with the first speaker. In some embodiments, a third electronic device (e.g., a third speaker) also receives the modified media content information and decodes the timing information to synchronize playback between the first, second and third electronic devices.

In some embodiments, the first electronic device 102-1 overlays the data with the media content item automatically (e.g., without user input). For example, the first electronic device 102-1 overlays the data for media content items stored in media content database 332 and stores the modified version of the media content items in media content database 332. In response to receiving a user request for a first media content item, the media content server 104 streams the modified first media content item to the user.

In some embodiments, a media content item is presented over one or more channels. For example, a media content item includes left channel content for presentation over a left channel 402 and right channel content for presentation over a right channel 404. In some embodiments, the one or more channels include a left channel, a right channel, and a center channel. For example, the one or more channels comprise a surround sound system (or other configuration of the one or more channels) (e.g., a 4-channel sound system, a 5.1 channel sound system, or a 6 channel sound system). In some embodiments, the media content item presents different audio signals over the one or more channels. For example, the media content item presents a first set of audio signals over left channel 402 and a second set of audio signals over the right channel 404. For example, a media content item presented in stereo may present a vocal track over the left channel and a non-vocal (e.g., instrumental) track over the right channel. One of ordinary skill in the art understands that different components of a media content item can be presented over separate channels.

In some embodiments, a first electronic device (e.g., electronic device 102-1) determines one or more audio events for the first media content item. For example, the electronic device determines audio event 406-1, audio event 406-2, and audio event 406-3 for the portions of the media content item that are presented on the left channel. The electronic device determines audio event 406-4, audio event 406-5, and audio event 406-6 for the portions of the media content item that are presented on the right channel. In some embodiments, the first electronic device uses a machine-learning algorithm to identify the one or more audio events. In some embodiments, the audio events are identified based on a frequency, rhythm, and/or an amplitude (e.g., energy) of the audio signal. For example, audio event 406-1 is selected as an event because the amplitude of the audio signal is greater than a threshold amplitude (e.g., a predetermined threshold amplitude and/or an amplitude determined based on a distribution of amplitudes over the media content item (e.g., 70% of the maximum amplitude of the media content item). In some embodiments, an audio event is selected when a portion of the media content item (e.g., on that channel) has a relative high amplitude (e.g., compared to other portions of the media content item).

In some embodiments, an audio event is selected for the one or more channels (e.g., left channel 402 and right channel 404) together. For example, audio event 406-1 and audio event 406-4 occur at substantially a same time within a media content item. For example, audio events are selected when audio events align (e.g., in time) for both the left and right channels. In some embodiments, the electronic device determines a total (e.g., summed) amplitude of the audio signals presented on both the left channel 402 and the right channel 404, and determines that audio events (e.g., audio event 406-1 and audio event 406-4) occur when the total amplitude exceeds a threshold amplitude.

In some embodiments, the electronic device determines, for a media content item, one or more audio events for the one or more channels individually. For example, audio event 406-3 is determined for the left channel 402, and audio event 406-6 is identified on the right channel (e.g., at a time within the media content item that is distinct from the time that audio event 406-3 occurs).

In some embodiments, the audio events are determined based on detection of a periodic beat (e.g., downbeat) that occurs within the media content item. For example, a beat comprises an accented musical event (e.g., with high amplitude relative to other portions of the media content item). By selecting an audio event with a high amplitude, the overlaid data is embedded with an amplitude lower than the amplitude of the audio event. For example, the high amplitude of the audio event masks the relatively lower amplitude of the superimposed data. As shown in FIG. 4, the first set of data for the left channel 408-1 is encoded with an amplitude that is lower than the audio event 406-1. A user does not perceive the first set of data 408-1 because the amplitude of audio event 406-1 masks the additional data. FIG. 4 also illustrates a first set of data for the right channel 408-2 that is encoded (e.g., as an audio signal) with an amplitude that is lower than audio event 406-4. In some embodiments, audio events for respective channels occur during a same time period. For example, audio event 406-1 occurs during a time period corresponding to a time period of audio event 406-4.

The electronic device determines (e.g., after identifying audio event(s) for the left channel and/or the right channel) one or more sets of data (e.g., stored in data module 320) to encode the one or more sets of data into audio and superimpose the encoded data onto one or more of the channels as audio signals. For example, a third set of data for the left channel 412-1 is superimposed over audio event 406-3 and a third set of data for the right channel 412-2 is superimposed over audio event 406-6. For example, the sets of data include information related to the media content item. In some embodiments, a first set of data includes information that is distinct from a second set of data. For example, a first set of data includes a first set of lyrics of the media content item for a first portion of the media content item (e.g., corresponding to the portion in which the lyrics are superimposed on the media content item) and a second set of data includes a second set of lyrics of the media content item (e.g., the lyrics corresponding to the second portion of the media content item on which the second set of data is superimposed). In some embodiments, the sets of data superimposed on the media content item are decoded and displayed for the user (e.g., at a second electronic device) during playback of the media content item (e.g., at a first electronic device) (e.g., the lyrics corresponding to a respective portion of the media content item are displayed while the respective portion of the media content item is playing). In some embodiments, each set of data includes the same information. For example, the title of the media content item is embedded into the media content item at each audio event.

In some embodiments, the data includes timing information. For example, a timestamp is embedded into the media content item. The second electronic device is enabled to determine an offset (e.g., by decoding the modified media content item) and synchronize playback of the media content item. For example, the second electronic device determines a delay (e.g., offset) between the time of received timestamp and a time the embedded information was received. In some embodiments, the second electronic device changes (e.g., delays or skips forward) the portion of the media content item output at the second electronic device to match (e.g., synchronize) the output to the output of the first electronic device.

In some embodiments, the sets of data are encoded using a frequency range and/or composition that corresponds to a detected frequency range and/or composition of the media content item. In some embodiments, the sets of data are encoded as noise (e.g., white noise, brown noise, pink noise, etc.). In some embodiments, a set of data is encoded as a watermark within a frequency range that is not perceivable to a human ear (e.g., outside of the audible frequency range of 20 Hz to 20,000 Hz). In some embodiments, the sets of data are encoded within a frequency that is detectable by the second electronic device.

In some embodiments, the sets of data are overlaid over a subset of occurrences of a beat (e.g., each occurrence of a beat) within the media content item.

In some embodiments, a set of data are overlaid with the media content item for a predetermined time after the first audio event (e.g., after the end of the beat). For example, audio event 406-5 occurs during a first time period (e.g., where the amplitude of the media content item presented over right channel 404 is greater than a threshold amplitude), and the second set of data for the right channel 410-2 is encoded as an audio signal that extends beyond the first time period of audio event 406-5. The set of data 410-2 is overlaid during and after the audio event 406-5. The set of data 410-2 is still unperceived by a user (e.g., listening to the media content item) because after a high amplitude musical event stops (e.g., after a beat), the sound from the musical event continues to reflect off of surfaces (e.g., in the room). In some embodiments, the time in which the set of data is superimposed after the audio event is less than a reverberation time (e.g., the amount of time it takes for reflected sound to decay).

The electronic device modifies the media content item by superimposing all of the sets of data with the determined audio events for each of the channels of the media content item. In some embodiments, the electronic device stores (e.g., in media content database 332) the modified media content item. In some embodiments, the modified media content item is be presented (e.g., streamed) to the user (e.g., in response to a request from the user). In some embodiments, the electronic device superimposes the sets of data over the media content item as the media content item is played back (e.g., in real time).

In some embodiments, the electronic device streams (e.g., for playback) the modified media content item. For example, media content server 104 streams the modified media content item for playback at electronic device 102-1. The modified media content item is transmitted, from media content server 104 (e.g., via electronic device 102-1), to second electronic device 102-m. In some embodiments, the first electronic device 102-1 applies the modification and outputs the modified media content item. In some embodiments, portions of the modification are performed at the media content server 104 and other portions are performed at electronic device 102-1. For example, the media content server 104 identifies the audio events and stores the data to be superimposed on the media content item, and electronic device 102-1 encodes the data, modifies the media content item, and outputs the modified media content item for playback.

Figure 5A:
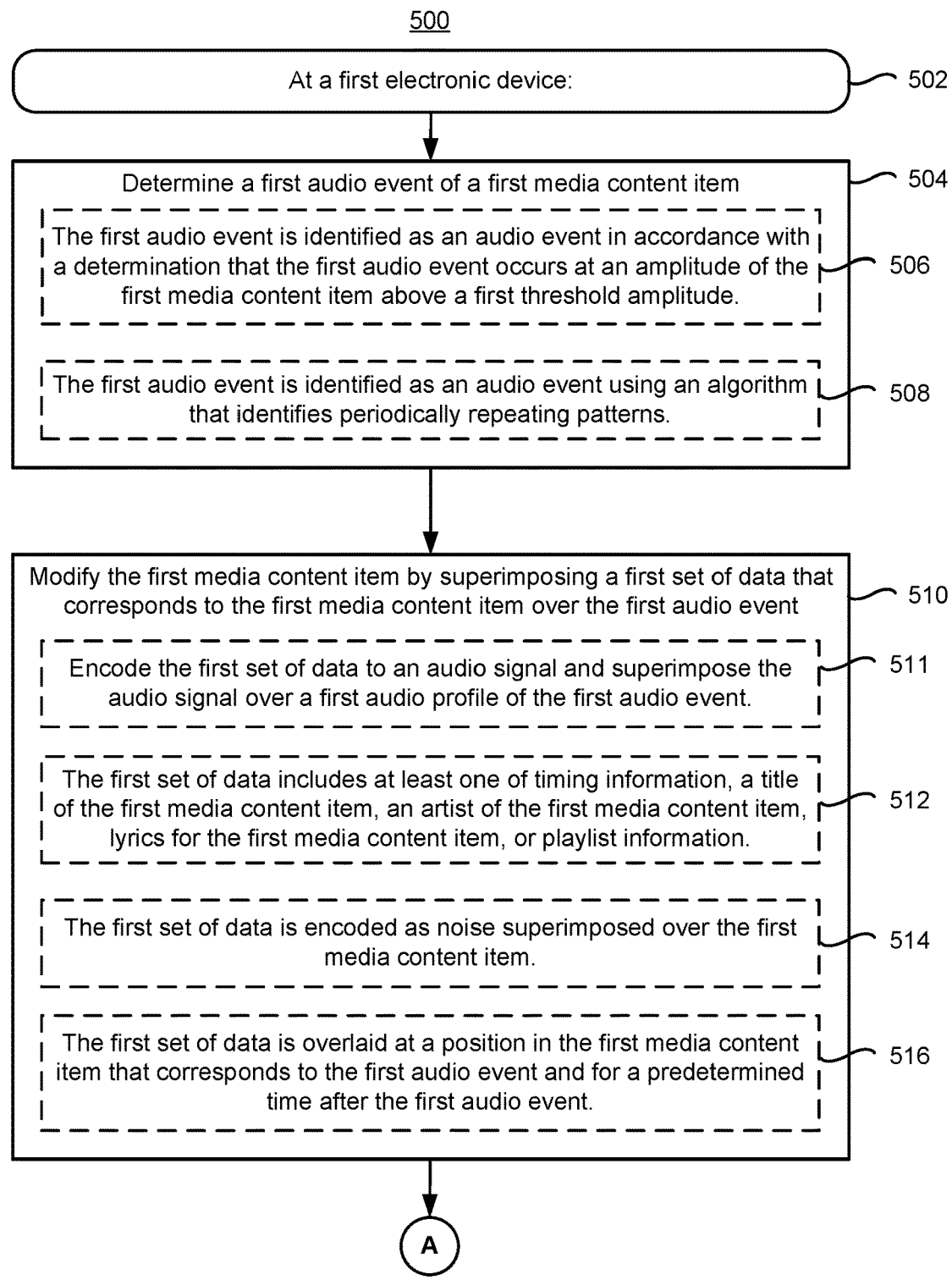
FIGS. 5A-5B are flow diagrams illustrating a method of modifying a media content item, in accordance with some embodiments.
Figure 5B:
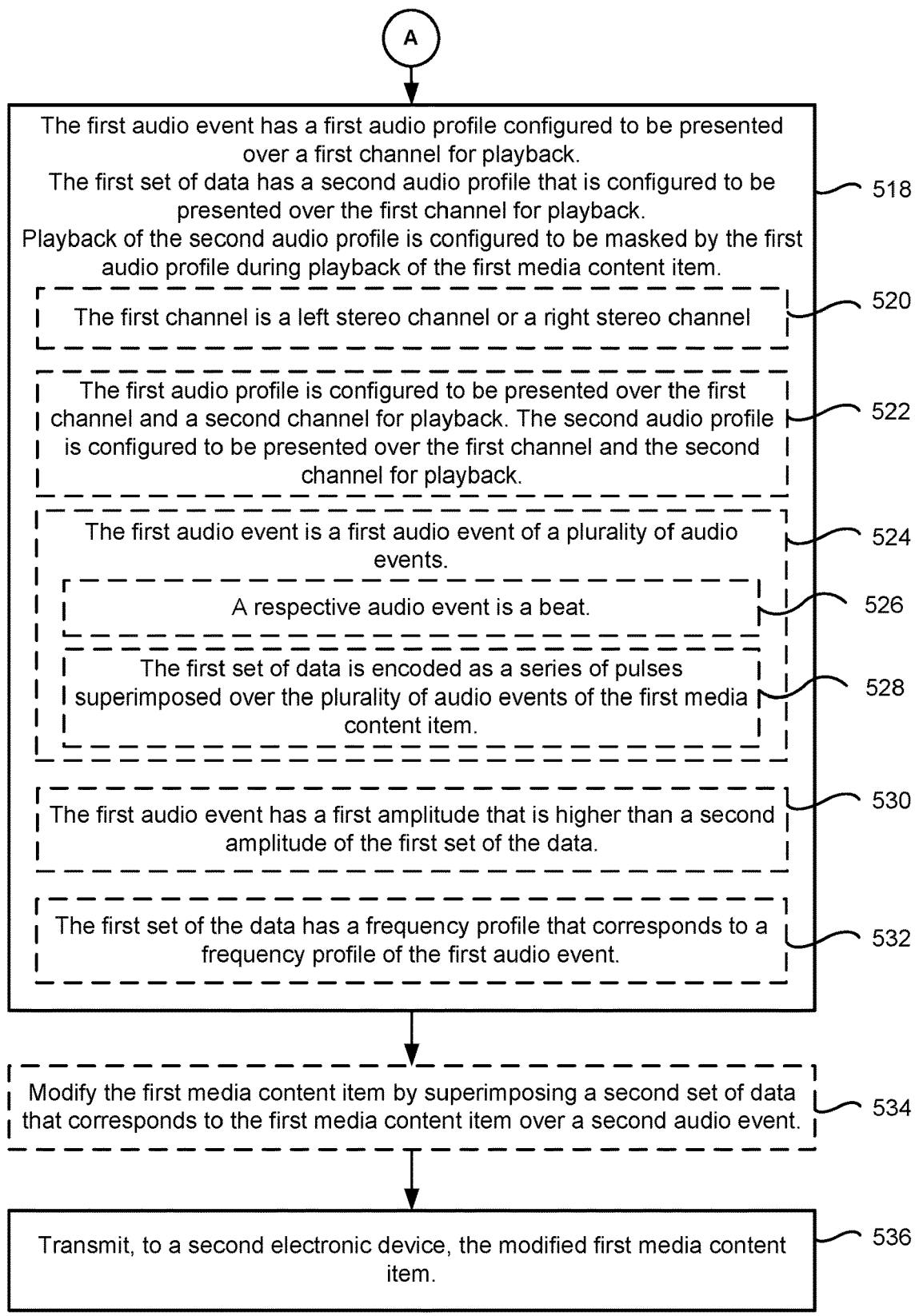

FIGS. 5A-5B are flow diagrams illustrating a method 500 for modifying a media content item, in accordance with some embodiments. Method 500 may be performed (502) at a first electronic device (e.g., media content server 104), the electronic device having one or more processors and memory storing instructions for execution by the one or more processors. In some embodiments, the method 500 is performed by executing instructions stored in the memory (e.g., memory 212, FIG. 2) of the electronic device. In some embodiments, the method 500 is performed by an electronic device 102-1. In some embodiments, the method 500 is performed by a combination of the server system (e.g., including media content server 104 and/or CDN 106) and an electronic device (e.g., electronic device 102-1).

Referring now to FIG. 5A, in performing the method 500, the first electronic device determines (504) a first audio event of a first media content item. For example, the first electronic device uses a machine-learning algorithm to determine amplitudes, frequencies, instrumental and/or vocal composition, periodic events (e.g., drum beat) and/or other information about the first media content item.

In some embodiments, the first audio event is identified (506) as an audio event in accordance with a determination that the first audio event occurs at an amplitude of the first media content item above a first threshold amplitude.

In some embodiments, the first audio event is identified (508) as an audio event using an algorithm that identifies periodically repeating patterns. For example, the machine-learning algorithm identifies amplitude patterns (e.g., periodic beats) and determines audio events occur where the amplitude of the media content item exceeds a threshold amplitude.

The first electronic device modifies (510) the first media content item by superimposing a first set of data that corresponds to the first media content item over the first audio event. For example, the first set of data 408-1 is superimposed over the first audio event 406-1. In some embodiments, the first set of data includes information about the media content item playing on left channel 402.

In some embodiments, the first electronic device encodes (511) the first set of data to an audio signal and superimposes the audio signal over a first audio profile of the first audio event.

In some embodiments, the first set of data includes (512) at least one of timing information, a title of the first media content item, an artist of the first media content item, lyrics for the first media content item, or playlist information.

In some embodiments, the first set of data is encoded (514) as noise superimposed over the first media content item. For example, the first set of data is encoded as noise (e.g., white noise, brown noise, pink noise, etc.) or modified noise.

In some embodiments, the first set of data is overlaid (516) at a position in the first media content item that corresponds to the first audio event and for a predetermined time after the first audio event.

The first audio event has (518) a first audio profile configured to be presented over a first channel for playback (e.g., the audio profile indicates the amplitudes for left and right stereo channels). For example, as shown in FIG. 4, the audio event 406-1 has a first audio profile (e.g., audio signals) for the left channel 402. The first set of data has a second audio profile configured to be presented over the first channel for playback. For example, the set of data 408-1 has a second audio profile (e.g., distinct from the first audio profile) for the left channel 402. Playback of the second audio profile is configured to be masked by the first audio profile during playback of the first media content item (e.g., the first audio event has a first amplitude that is higher than a second amplitude of the first set of the data and/or the first set of the data has a frequency profile that corresponds to a frequency profile of the first audio event). For example, the amplitude of the set of data 408-1 is lower than the amplitude of the audio event 406-1.

In some embodiments, the first channel is (520) a left stereo channel or a right stereo channel. For example, the first channel is left channel 402 (e.g., or right channel 404).

In some embodiments, the first audio profile is (522) configured to be presented over the first channel and a second channel for playback and the second audio profile is configured to be presented over the first channel and the second channel for playback. For example, with reference to FIG. 4, the first channel is left channel 402 and the second channel is right channel 404.

In some embodiments, the first audio event is (524) a first audio event of a plurality of audio events. For example, the first audio event corresponds to a first beat (e.g., a first accented musical event) in a series of beats.

In some embodiments, a respective audio event of the plurality of audio events is (526) a beat. For example, the beat comprises a repeated sequence of stressed notes, such as a drumbeat, a string of stressed bass notes, etc. In some embodiments, the stressed notes of the beat occur periodically (e.g., at fixed time intervals). In some embodiments, the stressed notes of the beat occur at variable time intervals.

In some embodiments, the first set of data is encoded (528) as a series of pulses superimposed over the plurality of audio events of the first media content item. For example, the first set of data is superimposed across a plurality of audio events (e.g., only a portion of the first set of data is superimposed in the first audio event). In some embodiments, the series of pulses comprise an audio signal. In some embodiments, the first electronic device encodes the pulses based on a lookup table (e.g., where the amplitude and/or frequency of the pulse corresponds to a portion of the first set of data). In some embodiments, the second electronic device includes a lookup table to interpret the received pulses and determine the first set of data.

In some embodiments, the first audio event has (530) a first amplitude that is higher than a second amplitude of the first set of the data. For example, as shown in FIG. 4, the amplitude of audio event 406-1 is higher than the amplitude of the first set of data 408-1.

In some embodiments, the first set of the data has (532) a frequency profile that corresponds to a frequency profile of the first audio event. For example, the first set of data is encoded as an audio signal having component frequencies that correspond to (e.g., substantially match) component frequencies of the audio event of the media content item. By matching the frequency profile of the first audio event with the frequency profile of the embedded data, the encoded first set of data is masked such that a user cannot detect the encoded data that is superimposed over the media content item.

In some embodiments, the first electronic device modifies (534) the first media content item by superimposing a second set of data that corresponds to the first media content item over a second audio event. For example, as shown in FIG. 4, a second set of data 410-1 is superimposed onto the first media content item that is presented over the left channel. The second set of data 410-1 is distinct from the first set of data 408-1. In some embodiments, the second audio event 406-2 occurs at a time distinct from the first audio event 406-1.

The first electronic device transmits (536), to a second electronic device, the modified first media content item. For example, the modified first media content item includes the sets of data. In some embodiments, the second electronic device receives (e.g., using microphone 254) the modified first media content item. In some embodiments, the second electronic device is configured to decode (e.g., using embedded data decoding module 232) the modified first media content item. For example, the second electronic device extracts the sets of data that were superimposed at the first electronic device. In some embodiments, the second electronic device displays the extracted data. For example, the second electronic device decodes and displays a title of the media content item that was superimposed in the first audio event of the first media content item.

Although FIGS. 5A-5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
    at a first electronic device associated with a media-providing service, the first electronic device having one or more processors and memory storing instructions for execution by the one or more processors:
        determining a first accented musical event of a first media content item, the first accented musical event having an amplitude that satisfies a first threshold;
        modifying the first media content item by superimposing a first set of data over the first accented musical event, wherein:
            the first accented musical event has a first audio profile,
            the first set of data has a second audio profile, and
            playback of the second audio profile is configured to be masked by the first audio profile during playback of the first media content item; and
        transmitting, to a second electronic device, the modified first media content item.

2. The method of claim 1, wherein:
    the first audio profile is configured to be presented over a first channel for playback, and
    the second audio profile is configured to be presented over the first channel for playback.

3. The method of claim 2, wherein the first channel is a left stereo channel or a right stereo channel.

4. The method of claim 2, wherein the first set of data for the first channel is encoded with an amplitude that is lower than the amplitude of the first accented musical event.

5. The method of claim 1, wherein:
    the first audio profile is configured to be presented over a first channel and a second channel for playback, and
    the second audio profile is configured to be presented over the first channel and the second channel for playback.

6. The method of claim 1, wherein the first accented musical event is a first accented musical event of a plurality of accented musical events.

7. The method of claim 6, wherein a respective accented musical event of the plurality of accented musical events is a beat.

8. The method of claim 6, wherein the first set of data is encoded as a series of pulses superimposed over the plurality of accented musical events of the first media content item.

9. The method of claim 1, wherein the first accented musical event is identified as an accented musical event using an algorithm that identifies periodically repeating patterns.

10. The method of claim 1, wherein the first set of data includes at least one of timing information, a title of the first media content item, an artist of the first media content item, lyrics for the first media content item, or playlist information.

11. The method of claim 1, wherein the first set of data is encoded as noise superimposed over the first media content item.

12. The method of claim 1, wherein the first set of data is overlaid at a position in the first media content item that corresponds to the first accented musical event and for a predetermined time after the first accented musical event.

13. The method of claim 1, wherein the first accented musical event has a first amplitude that is higher than a second amplitude of the first set of data.

14. The method of claim 1, wherein the first set of data has a frequency profile that corresponds to a frequency profile of the first accented musical event.

15. The method of claim 1, including modifying the first media content item by superimposing a second set of data that corresponds to the first media content item over a second accented musical event.

16. The method of claim 15, wherein the first accented musical event and the second accented musical event occur during a same time period.

17. The method of claim 15, wherein the first accented musical event is configured to be presented over a first channel, and the second accented musical event is configured to be presented over a second channel.

18. The method of claim 1, wherein modifying the first media content item by superimposing the first set of data that corresponds to the first media content item over the first accented musical event comprises encoding the first set of data to an audio signal and superimposing the audio signal over the first audio profile of the first accented musical event.

19. A first electronic device comprising:
    one or more processors; and
    memory storing instructions for execution by the one or more processors, the instructions including instructions for:
        determining a first accented musical event of a first media content item, the first accented musical event having an amplitude that satisfies a first threshold;
        modifying the first media content item by superimposing a first set of data over the first accented musical event, wherein:
            the first accented musical event has a first audio profile,
            the first set of data has a second audio profile, and
            playback of the second audio profile is configured to be masked by the first audio profile during playback of the first media content item; and
        transmitting, to a second electronic device, the modified first media content item.

20. A non-transitory computer-readable storage medium storing instructions, which when executed by an electronic device, cause the electronic device to:
    determine a first accented musical event of a first media content item, the first accented musical event having an amplitude that satisfies a first threshold;

modify the first media content item by superimposing a first set of data over the first accented musical event, wherein:
  the first accented musical event has a first audio profile,
  the first set of data has a second audio profile, and
  playback of the second audio profile is configured to be masked by the first audio profile during playback of the first media content item; and
transmit, to a second electronic device, the modified first media content item.

* * * * *